United States Patent
Wittke et al.

(10) Patent No.: US 11,453,487 B2
(45) Date of Patent: Sep. 27, 2022

(54) REDUNDANT HELICOPTER PITCH CHANGE BEARING

(71) Applicant: Sikorsky Aircraft Corporation, Stratford, CT (US)

(72) Inventors: Kevin M. Wittke, Milford, CT (US); Bertrand J. Howard, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1127 days.

(21) Appl. No.: 16/022,162

(22) Filed: Jun. 28, 2018

(65) Prior Publication Data
US 2020/0001992 A1  Jan. 2, 2020

(51) Int. Cl.
| | |
|---|---|
| *B64C 27/59* | (2006.01) |
| *B64C 11/06* | (2006.01) |
| *B64C 27/78* | (2006.01) |
| *F16C 19/54* | (2006.01) |
| *F16C 19/52* | (2006.01) |
| *F16C 39/02* | (2006.01) |

(52) U.S. Cl.
CPC .............. *B64C 27/59* (2013.01); *B64C 11/06* (2013.01); *B64C 27/78* (2013.01); *F16C 19/52* (2013.01); *F16C 19/54* (2013.01); *F16C 39/02* (2013.01); *F16C 2326/43* (2013.01)

(58) Field of Classification Search
None
See application file for complete search history.

(56) References Cited

U.S. PATENT DOCUMENTS 3,737,202 A * 6/1973 Rosales ................. F16C 19/55
384/461
3,811,742 A * 5/1974 Rosales ................. F16C 19/55
384/461
(Continued)

FOREIGN PATENT DOCUMENTS

CA 2861291 A1 * 6/2015 ............. F01D 21/14
EP 3587845 A1 * 1/2020 ............. B64C 11/06
(Continued)

OTHER PUBLICATIONS

Extended European Search Report; International Application No. 19182757.5-1010; International Filing Date: Jun. 27, 2019; dated Nov. 8, 2019; 9 pages.

*Primary Examiner* — Kevin R Steckbauer
(74) *Attorney, Agent, or Firm* — Michael Best & Friedrich LLP

(57) ABSTRACT

An aircraft rotor system includes a rotating pitch change shaft which rotates about an axis, a translating element disposed within the rotating pitch change shaft and movable along the axis and a pitch change bearing assembly which transfers movement of the translating element to the pitch change shaft. The pitch change bearing assembly includes a primary bearing and a secondary bearing coupled to the rotating pitch change shaft via the translating element when the primary bearing is in a first mode. A thrust shoulder is coupled to the translating element. The thrust shoulder is movable into engagement with the secondary bearing in response to failure of the primary bearing such that in a second mode, movement of the translating element is primarily transferred to the pitch change shaft via the secondary bearing.

19 Claims, 4 Drawing Sheets

(56) References Cited

U.S. PATENT DOCUMENTS

| | | | | |
|---|---|---|---|---|
| 4,501,454 | A * | 2/1985 | Dennis | F16C 41/02 384/619 |
| 4,641,978 | A * | 2/1987 | Kapich | F01D 25/16 384/624 |
| 4,668,109 | A * | 5/1987 | Basso | F16C 19/54 384/473 |
| 5,998,894 | A * | 12/1999 | Raad | H02K 7/083 310/90 |
| 7,448,808 | B2 * | 11/2008 | Bouchy | F01D 25/16 384/624 |
| 7,736,062 | B2 * | 6/2010 | Hagshenas | H02K 5/1732 384/624 |
| 8,057,184 | B2 * | 11/2011 | Sebald | F16C 19/543 384/465 |
| 8,104,969 | B2 * | 1/2012 | Jimenez de Castro Fernandez | F16C 19/55 384/540 |
| 8,283,825 | B2 * | 10/2012 | Maier | F16C 19/507 310/90 |
| 8,308,364 | B2 * | 11/2012 | Tecza | F16C 32/0442 384/99 |
| 8,630,062 | B2 * | 1/2014 | Shimizu | G11B 5/5569 360/99.08 |
| 8,646,982 | B2 * | 2/2014 | Radinger | F16C 33/6603 384/461 |
| 8,876,393 | B2 * | 11/2014 | Snelick | F16C 33/7846 384/448 |
| 8,887,450 | B2 * | 11/2014 | Blackwelder | F16C 19/54 52/118 |
| 9,169,011 | B2 * | 10/2015 | Hunter | B64C 27/32 |
| 9,188,156 | B2 * | 11/2015 | Maier | F16C 35/077 |
| 9,287,749 | B2 * | 3/2016 | Kümmlee | F16C 39/02 |
| 9,315,265 | B2 * | 4/2016 | Halcom | B64C 27/06 |
| 9,359,073 | B2 * | 6/2016 | Hewitt | F16C 19/54 |
| 9,382,940 | B2 * | 7/2016 | Lee | F16C 19/542 |
| 9,470,262 | B2 * | 10/2016 | Gallimore | F16C 41/02 |
| 9,481,376 | B2 * | 11/2016 | Schmidinger | F16C 19/55 |
| 9,651,092 | B2 * | 5/2017 | Gallimore | F16C 41/02 |
| 9,658,132 | B2 * | 5/2017 | Gallimore | F16C 19/522 |
| 9,746,027 | B2 * | 8/2017 | Anders | F16C 35/073 |
| 9,777,596 | B2 * | 10/2017 | Raykowski | F16C 35/067 |
| 9,816,551 | B2 * | 11/2017 | Regnier | F16C 19/547 |
| 9,840,325 | B2 * | 12/2017 | Sutton | F16C 17/10 |
| 9,841,053 | B2 * | 12/2017 | Siebke | F16C 32/0442 |
| 10,184,523 | B2 * | 1/2019 | Vermande | F16C 21/00 |
| 10,233,997 | B2 * | 3/2019 | Howard | F16H 1/2863 |
| 10,330,148 | B2 * | 6/2019 | Buesing | F16C 33/203 |
| 10,745,122 | B2 * | 8/2020 | Mullen | F16C 19/54 |
| 2008/0279689 | A1 * | 11/2008 | Sebald | F16C 19/543 416/174 |
| 2009/0074338 | A1 * | 3/2009 | Hagshenas | H02K 11/25 310/62 |
| 2011/0052109 | A1 * | 3/2011 | Tecza | H02K 7/083 384/114 |
| 2011/0085752 | A1 * | 4/2011 | Tecza | F16C 27/04 384/295 |
| 2014/0072254 | A1 * | 3/2014 | Pausch | F16C 27/04 384/513 |
| 2014/0321785 | A1 * | 10/2014 | Maier | F16C 23/084 384/456 |
| 2015/0034760 | A1 * | 2/2015 | Hewitt | F16C 19/52 384/456 |
| 2015/0097457 | A1 * | 4/2015 | Kummlee | F16C 39/02 310/90.5 |
| 2015/0176431 | A1 * | 6/2015 | Raykowski | F16C 19/52 415/9 |
| 2015/0240868 | A1 * | 8/2015 | Buesing | F16F 1/40 416/134 A |
| 2015/0267744 | A1 * | 9/2015 | Gallimore | F16C 27/08 384/563 |
| 2015/0298803 | A1 * | 10/2015 | Halcom | B64C 27/605 416/112 |
| 2016/0091020 | A1 * | 3/2016 | Siebke | F16C 27/04 384/535 |
| 2017/0003196 | A1 * | 1/2017 | Gallimore | G01M 13/04 |
| 2017/0030432 | A1 * | 2/2017 | Howard | F16H 1/2863 |
| 2017/0350454 | A1 * | 12/2017 | Vermande | F16C 21/00 |
| 2019/0276144 | A1 * | 9/2019 | Mullen | B64C 27/58 |
| 2020/0001992 | A1 * | 1/2020 | Wittke | F16C 35/073 |
| 2021/0003173 | A1 * | 1/2021 | Calatraba | F16C 19/548 |
| 2021/0332847 | A1 * | 10/2021 | Stich | F16C 33/588 |

FOREIGN PATENT DOCUMENTS

| | | | |
|---|---|---|---|
| JP | S57192619 A | 11/1982 | |
| RU | 2348566 C1 * | 3/2009 | B64C 11/06 |

\* cited by examiner

REDUNDANT HELICOPTER PITCH CHANGE BEARING

BACKGROUND

Embodiments disclosed herein relate to an aircraft tail rotor system, and more particularly, to a pitch change shaft bearing assembly for use with an aircraft tail rotor system.

In a typical rotary wing aircraft, such as a helicopter for example, a tail rotor system converts tail driveshaft rotary power into the aerodynamic forces necessary to control the direction of flight and to counteract main rotor torque.

A tail rotor head system provides a mounting point for connecting a plurality of tail rotor blades to a blade pitch change mechanism. The pitch of the tail rotor blades is controlled by a position of a tail rotor pitch change shaft. The position of the pitch change shall is controlled by a tail rotor servo. When the tail rotor servo pulls the pitch change shaft inboard, the pitch beam and the blade pitch links twist the tail rotor blades about internal elastomeric bearings to increase the blade pitch. Conversely, when the pitch change servo permits the pitch change shaft to move outboard, the pitch change shaft bearing and the blade pitch links twist the tail rotor blades about internal elastomeric bearings to decrease blade pitch. This adjustment in the blade pitch is used to control a turning direction of the aircraft.

The pitch change shaft rotates with and moves linearly within a rotating tail rotor shaft. A pitch change bearing supports the pitch change shaft within the tail rotor shaft and allows the pitch change shaft and tail rotor shaft to rotate independently of the non-rotating pitch change servo rod. The pitch change shaft bearing outer raceway rotates with the pitch change shaft and the tail rotor shaft, while the inner raceway is non-rotating but moves linearly with the tail rotor servo piston rod.

BRIEF DESCRIPTION

According to an embodiment, an aircraft rotor system includes a rotating pitch change shaft which rotates about an axis, a translating element disposed within the rotating pitch change shaft and movable along the axis and a pitch change bearing assembly which transfers movement of the translating element to the pitch change shaft. The pitch change bearing assembly includes a primary bearing and a secondary bearing coupled to the rotating pitch change shaft via the translating element when the primary bearing is in a first mode. A thrust shoulder is coupled to the translating element. The thrust shoulder is movable into engagement with the secondary bearing in response to failure of the primary bearing such that in a second mode, movement of the translating element is primarily transferred to the pitch change shaft via the secondary bearing.

In addition to one or more of the features described above, or as an alternative, in further embodiments comprising a biasing mechanism configured to apply a preload to the secondary bearing.

In addition to one or more of the features described above, or as an alternative, in further embodiments at least one of the primary bearing and the secondary bearing includes at least one rolling element.

In addition to one or more of the features described above, or as an alternative, in further embodiments the preload applied by the biasing mechanism causes the at least one rolling element to roll during operation in the first mode.

In addition to one or more of the features described above, or as an alternative, in further embodiments each of the roller bearing elements is capable of sustaining a thrust load.

In addition to one or more of the features described above, or as an alternative, in further embodiments the primary bearing includes a first bearing and a second bearing, the secondary bearing being positioned between the first bearing and the second bearing relative to the axis of the translating element.

In addition to one or more of the features described above, or as an alternative, in further embodiments the secondary bearing includes a third bearing and a fourth bearing coupled by a biasing mechanism, and the thrust shoulder is positioned within a clearance defined between the third bearing and the fourth bearing.

In addition to one or more of the features described above, or as an alternative, in further embodiments comprising a collar disposed between the first bearing and the translational element, wherein the translational element is movable relative to the collar, an axial groove formed in an outward facing surface of the first bearing, a washer disposed within the axial groove, a flange extending radially from the translating element, the flange being arranged in contact with a surface of the washer, another collar disposed between the second bearing and the translational element, wherein the translational element is movable relative to the another collar, another axial groove formed in an outward facing surface of the second bearing, another washer disposed within the another axial groove, and a nut coupled to the translating element, the nut being selectively engaged with the another washer.

In addition to one or more of the features described above, or as an alternative, in further embodiments comprising a shoulder extending from the translating element adapted to contact a first side of the thrust shoulder and a secondary collar extending between a second side of the thrust shoulder and the nut.

In addition to one or more of the features described above, or as an alternative, in further embodiments a surface of at least one of the washer and the another washer wears in response to failure of the primary bearing in the first mode.

In addition to one or more of the features described above, or as an alternative, in further embodiments in the first mode, movement of the translating element is primarily transferred to the pitch change shaft via the primary bearing.

In addition to one or more of the features described above, or as an alternative, in further embodiments in the second mode, movement of the translating element is primarily transferred to the pitch change shaft via the second bearing.

In addition to one or more of the features described above, or as an alternative, in further embodiments the aircraft tail rotor system transforms to the second mode upon failure of the primary bearing.

In addition to one or more of the features described above, or as an alternative, in further embodiments comprising a shield disposed between the primary bearing and the secondary bearing.

According to another embodiment, a method of transmitting movement to a pitch change shaft includes transmitting movement from a translating element to a pitch change shaft via a primary bearing, detecting a failure of the primary bearing, coupling a secondary bearing to the translating element in response to the failure of the primary bearing, and transmitting movement from the translating element to the pitch change shaft via the secondary bearing.

In addition to one or more of the features described above, or as an alternative, in further embodiments coupling the secondary bearing to the translating element further comprises moving a thrust shoulder coupled to the translating element into contact with the secondary bearing.

In addition to one or more of the features described above, or as an alternative, in further embodiments the thrust shoulder is movable in a first direction to couple the translating element to the secondary bearing.

In addition to one or more of the features described above, or as an alternative, in further embodiments the thrust shoulder is movable in a second direction to couple the translating element to the secondary bearing.

In addition to one or more of the features described above, or as an alternative, in further embodiments the thrust shoulder does not translate relative to the primary bearing while movement is transmitted from the translating element to the pitch change shaft via the primary bearing.

In addition to one or more of the features described above, or as an alternative, in further embodiments coupling the secondary bearing to the translating element further comprises decoupling the primary bearing from the translating element.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
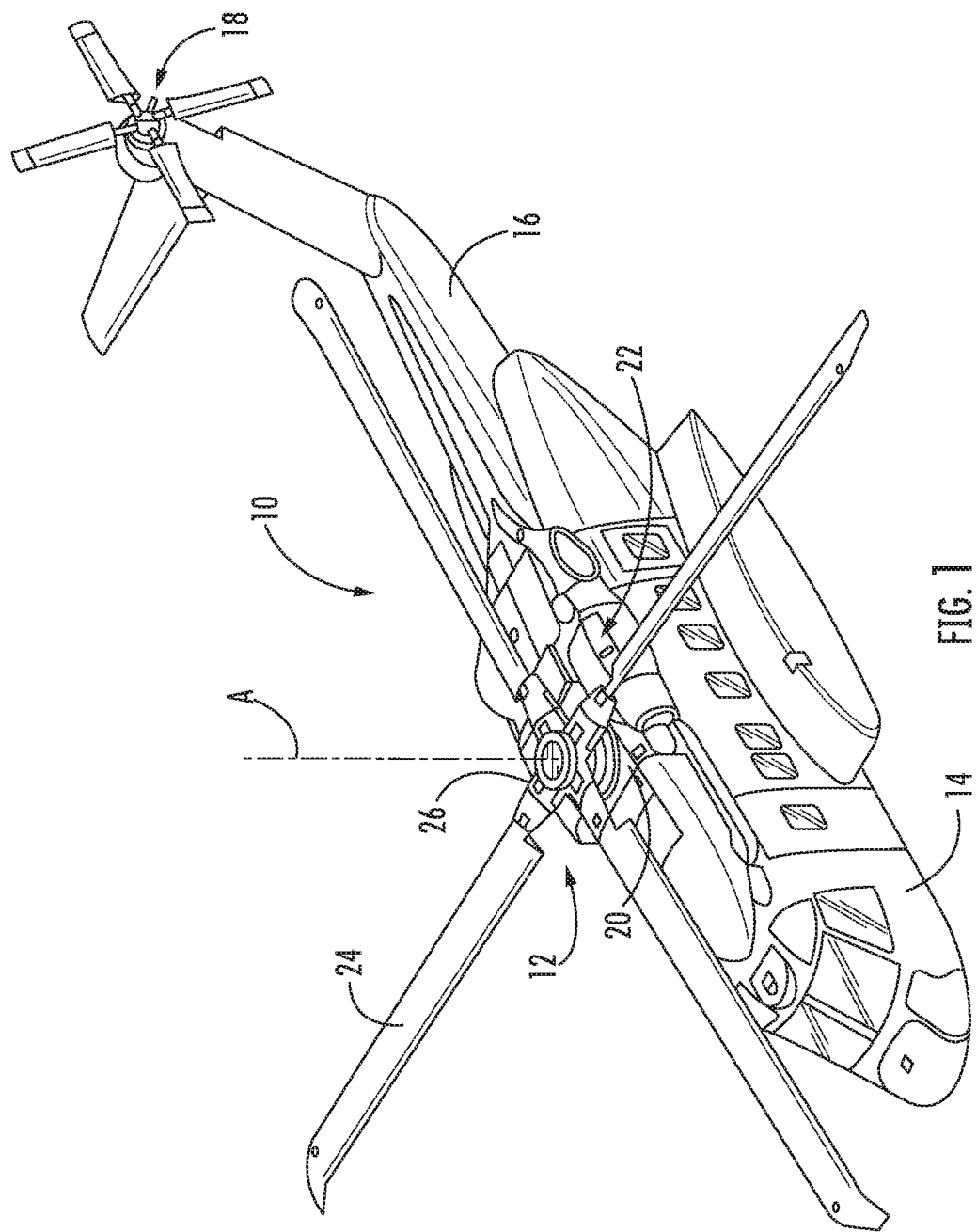
FIG. 1 is a perspective view of an example of a rotary wing aircraft.

With reference now to FIG. 1A, an example of a vertical takeoff and landing (VTOL) aircraft is schematically illustrated. The aircraft 10 in the disclosed, non-limiting embodiment includes a main rotor system 12 supported by an airframe 14 having an extending tail 16 which mounts an anti-torque system 18. The main rotor assembly 12 is driven about an axis of rotation A through a main rotor gearbox (MGB) 20 by one or more engines 22. The engines 22 generate the power available for flight operations and couples such power to the main rotor assembly 12 and the anti-torque system 18 through the MGB 20. The main rotor system 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines or any application with a critical bearing of the configuration described herein will also benefit here from.

Figure 2:
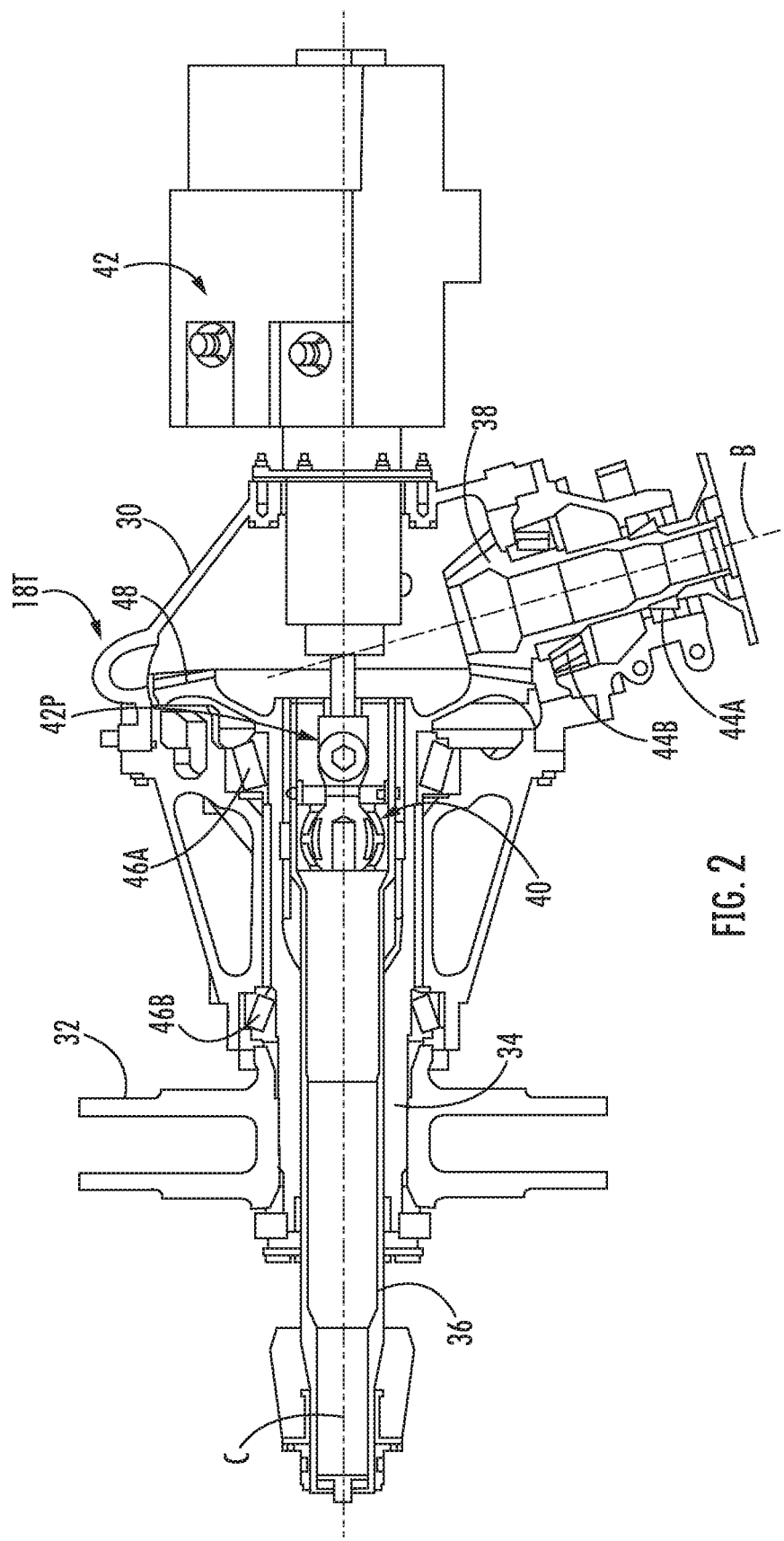
FIG. 2 is a sectional view of a gear module of an anti torque system of the rotary wing aircraft of FIG. 1.

Referring now to FIG. 2, the anti-torque system 18 includes a gear module 18T driven by the main gearbox 20.

The gear module 18T generally includes a housing 30, a tail blade cuff assembly 32, a tail rotor drive shaft 34, a tail rotor pitch change shaft 36, a drive gear 38, a pitch change bearing assembly 40 and a pitch change servo 42. The drive gear 38 is supported upon bearings 44A, 44B for rotation about an axis of rotation B. The tail rotor drive shaft 34 is supported upon bearings 46A, 46B for rotation about an axis of rotation C. The drive gear 38 engages a shaft gear 48 to rotate the tail rotor drive shaft 34 and the attached blade cuff assembly 32. Tail rotor blades (not shown) are attached to the blade cuff assembly 32. The tail rotor pitch change shaft 36 rotates with the tail rotor drive shaft 34 about the axis of rotation C, but serves no significant power transmission function.

The pitch change shaft 36 rotates with and moves linearly within the rotating tail rotor drive shaft 34. As shown, the bearing assembly 40 may include a spherical bearing 50 that supports the pitch change shaft 36 in a manner that allows that pitch change shaft 36 to rotate independently of the pushrod 42P coupled to the servo 42. However, in other embodiments, the bearing assembly 40 may include one or more roller bearings, including but not limited to cylindrical, tapered, spherical, or ball bearings, or any other bi-directional (push-pull) bearing arrangement. An outer surface or race of the bearing 50 rotates with the pitch change shaft 36 while an inner surface or race of the bearing 50 is non-rotating and is coupled to the pushrod 42P for linear movement via the servo 42. Through this engagement with the bearing 50, the tail rotor pitch change shaft 36 slides along the axis of rotation C in response to actuation of the servo 42 to change the pitch of the tail blade cuff assembly 32 and the tail rotor blades attached thereto (not shown) and thus reduces or increases the thrust of the anti-torque system 18.

Figure 3:
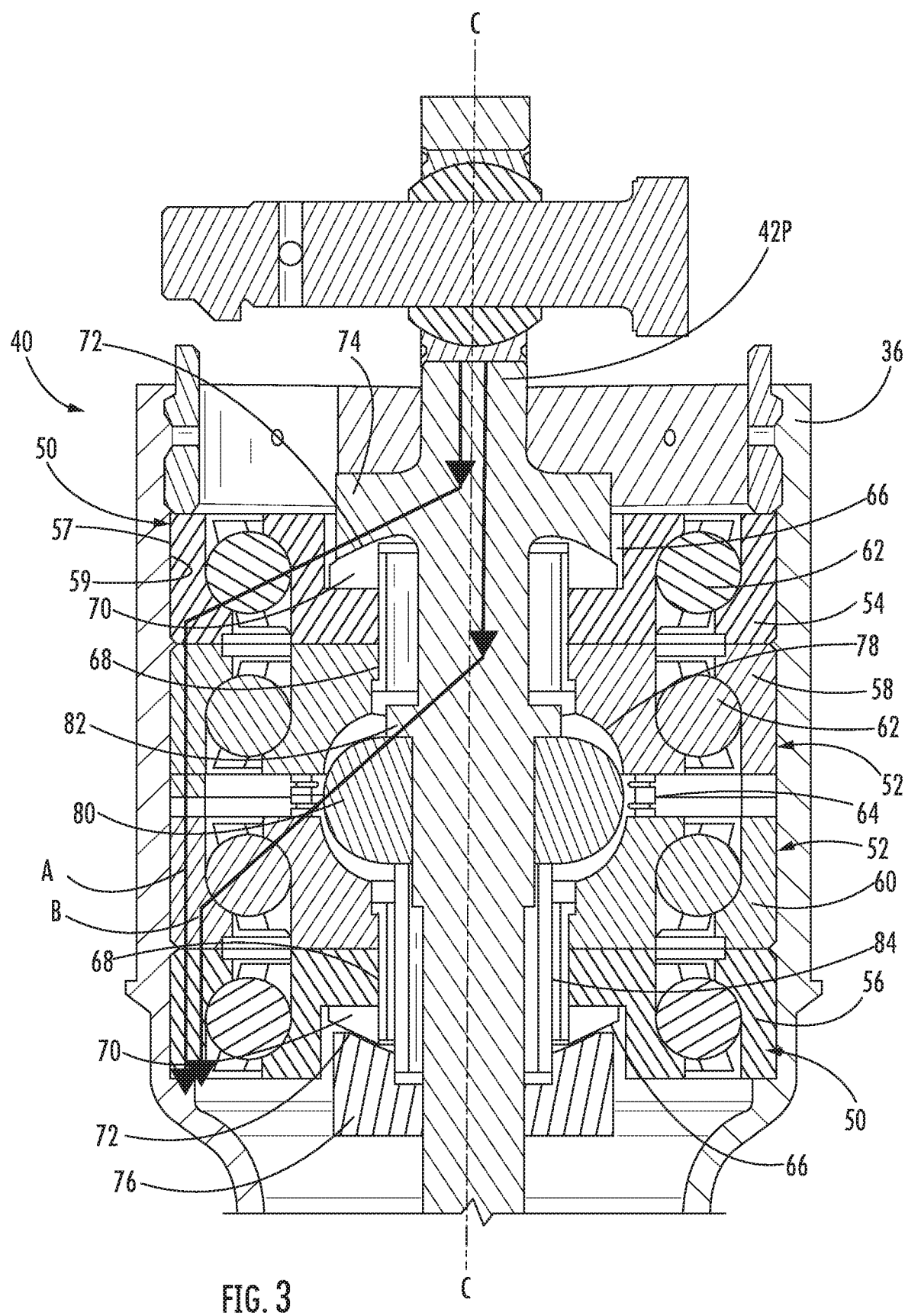
FIG. 3 is a cross-sectional view of a pitch change bearing assembly of the gear module in a first mode of operation according to an embodiment.

With reference to FIGS. 2 and 3, the pitch change bearing assembly 40 can fail in flight. Accordingly, to maintain normal operation of the aircraft in the event of a failure of the pitch change shaft bearing 50, in an embodiment, the pitch change shall bearing assembly 40 is a redundant bearing assembly including not only a primary bearing 50, but also a secondary bearing 52. During normal operation, the primary bearing 50 of the redundant pitch change bearing assembly 40 operates as the principally loaded bearing, in a manner similar to an existing pitch change bearing assembly. The secondary bearing 52 is provided as a backup bearing that is operational to transmit linear movement from the pushrod 42P to the pitch change shaft 36 when a failure of the primary bearing 50 has occurred, and is loaded lightly during normal operation. The secondary bearing 52 is always working as a bearing and will do some very limited load share with the primary bearing 50. This load share is critical to prevent issues like false brinnelling or skidding due to either not rotating or being insufficiently loaded for the rolling elements to roll instead of slide. These issues are eliminated so that the backup hearing 52 does not fail before even being called upon.

With reference now to FIG. 3, an example of the redundant pitch bearing assembly 40 according to an embodiment is illustrated in more detail. As Shown, the primary hearing 50 includes a first roller bearing 54 and a second, substantially identical roller bearing 56 spaced apart from one another along an axis of the pushrod 42P. An outer race 57 of the first and second roller bearings 54, 56 is coupled to the inner surface 59 of the rotatable pitch change shaft 36. The secondary bearing 52 is located between the first and second bearings 54, 56 of the primary bearing 50. In the illustrated, non-limiting embodiment, the secondary bearing 52 similarly includes a first bearing 58 and a second bearing 60.

Although not shown, a heat or debris shield or other protective layer may be positioned between the primary and secondary bearings 50, 52 to preserve the secondary bearing 52 in the event of a severe primary bearing failure.

The first and second bearing 54, 56 of the primary bearing 50 may be arranged in a back to back configuration and the first and second bearing 58, 60 of the secondary bearing 52 may be arranged in a face-to face configuration. Accordingly, the first and second bearing 54, 56 of the primary bearing 50 are rotated 180° relative to one another with the same surface of each bearing 54, 56 facing outwards, and the first and second bearing 58, 60 of the secondary bearing 52 are rotated 180° relative to one another with the same surface of each bearing 58, 60 facing toward one another. However, it should be understood that in other embodiments, a secondary bearing 52 including a single bearing, or alternatively, more than two bearings are also contemplated herein, particularly in the case of single direction axial loading arrangements.

Although the rolling elements 62 of each of the bearings 54, 56, 58, and 60 are illustrated as ball bearings, it should be understood that any suitable rolling element is within the scope of the disclosure. The first and second bearings 58, 60 of the secondary bearing 52 may be roller bearings similar to, or different from the roller bearings 54, 56 of the primary bearing 50. In an embodiment, the number of roller bearing elements 62 associated with each of the primary bearing 50 and the secondary bearing 52 may different to produce a different acoustic or vibration frequency, for purposes of fault-diagnostic capability.

Typically, the use of two bearings 58, 60 in close proximity, as shown, would raise concerns regarding failure of the secondary bearing due to overheating and "running tight." Accordingly, a biasing mechanism 64, such as an axial compression spring for example, is positioned between the first and second bearings 58, 60 of the secondary bearing 52 to preload the balls 62 slightly and make them roll instead of slide during operation. The biasing mechanism 64 allows for thermal growth of the secondary bearing 52 without imparting large forces on the rolling elements 62 thereof.

In the illustrated, non-limiting embodiment, each of the first and second bearings 54, 56 of the primary bearing 50 has an axial groove 66 formed in an outwardly facing side of the bearing 54, 56. As shown, the grooves 66 extend through only a portion of the bearings 54, 56. A collar 68 is arranged concentrically with the pushrod 42P at a position between the pushrod 42P and the inner race of the first and second bearings 54, 56 of the primary bearing 50. In the illustrated, non-limiting embodiment, a diameter of the collar is greater than the diameter of the pushrod 42P such that motion of the pushrod 42P is not directly transmitted to the collar via contact therewith.

A washer 70 is disposed within each of the axial grooves 66 and is adapted to receive a portion, such as an end fir example, of the collar 68. The collar 68 and washer 70 are fastened, such as by threading for example, to hold the inner rings of adjacent bearings concentrically and axially clamped together. In an embodiment, an exposed surface 72 of the washer 70 has a generally spherical surface. The pushrod 42P includes a radially extending flange 74 arranged generally adjacent the first bearing 54 of the primary bearing 50. In an embodiment, a surface of the flange 74 configured to abut the washer 70 includes a contour complementary to the spherical surface 72 of the washer 70 to facilitate engagement there between. However, this contour is intended to provide misalignment capability only, and is not required for embodiments that do not require misalignment capability. Similarly, a nut 76 may be coupled to the pushrod 42P adjacent the second bearing 56 of the primary bearing 50. The surface of the nut 76 configured to contact the surface 72 of the washer 70 may also have a spherical contour complementary to the washer 70.

Each of the first and second bearings 58, 60 of the secondary bearing 52 has a groove 78 formed in an inward facing side of the bearings 58, 60. As shown, the grooves 78 include a curvature and extend through only a portion of the bearings 58, 60. Mounted to the pushrod 42P at a position arranged within the clearance defined by the grooves 78 and the biasing mechanism 64 disposed between the first and second bearings 58, 60 is a thrust shoulder 80, such as formed from steel for example. In an embodiment, the shape of the thrust shoulder 80 is complementary to the contour of the grooves 78 formed in the first and second bearings 58, 60, respectively. Accordingly, through this configuration, the thrust shoulder 80 is movable to selectively engage and couple to at least one of the first and second bearing 58, 60 of the secondary bearing.

The pushrod 42P includes a shoulder 82 arranged adjacent a first, upstream side of the thrust shoulder 80. The diameter of the shoulder 82 is less than interior diameter of the adjacent collar 68 such that the shoulder 82 is receivable within the collar 68. In an embodiment, a secondary collar 84 extends between a downstream side of the thrust shoulder 82 and the nut 76. As shown, the secondary collar 84 may be received within the hollow interior of collar 68 and has an interior diameter larger than the diameter of the pushrod 42P. As a result, the secondary collar 84 does not directly contact the pushrod 42P.

During normal operation, shown in FIG. 3, the servo 42 moves the pushrod 42P linearly along its axis C. The axial movement of the pushrod. 42P is transmitted to the first and second bearing 54, 56 of the primary bearing 50 via the engagement of the flange 74 and/or nut 76 with the washers 70. Because the outer race 57 of the first and second bearing 54, 46 is coupled to the pitch change shaft 36, this axial movement of the bearings 54, 56 is transmitted to the pitch change shaft 36. The load path during operation of the primary bearing 50 is illustrated schematically by arrow A. During normal operation, a very small load is carried by a secondary load path through the biasing mechanism 64 and the secondary bearing 52. This is variable by selecting a desired stiffness of the biasing mechanism 64, with a typical application being approximately 10% of the primary bearing load.

Figure 4:
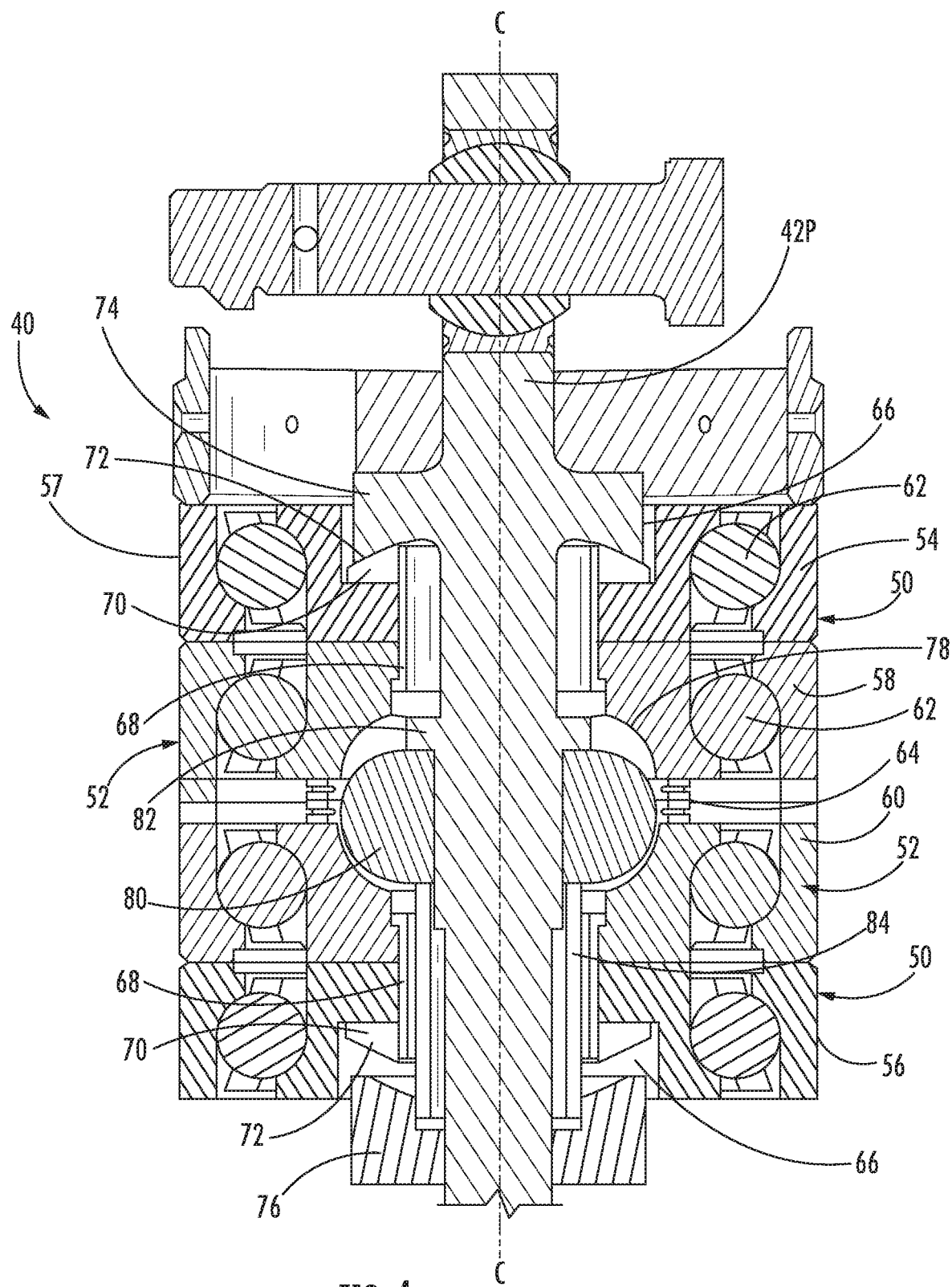
FIG. 4 is a cross-sectional view of a pitch change bearing assembly of the gear module in a second mode of operation according to an embodiment.

Upon failure of the primary bearing 50, the path along which linear motion is transmitted from the pushrod 42P to the pitch change shaft 36 is rerouted through the secondary bearing 52, as shown by line B. With reference to FIG. 4, in an embodiment, failure of the first or second bearing 54, 56 of the primary bearing may result in wear of the spherical surface 72 of the washer 70. As a result of this wear, the position of the pushrod 42P is generally shifted relative to the primary and secondary bearing assemblies 50, 52. As shown, in the shifted position and when the pushrod 42P translates in a first direction, the shoulder 82 pushes the thrust shoulder 80 into contact with a corresponding groove 78 formed in the second bearing 60 of the secondary bearing 52. The linear motion of the pushrod is transmitted to the secondary bearing 52 through this engagement. Because the outer race of the secondary bearing 52 is coupled to the pitch change shaft 36, this movement of the pushrod 42P is similarly transferred to the pitch change shaft 36, as illustrated schematically by arrow B (FIG. 3). If the pushrod 42P is moved in an opposite direction, the nut 76 coupled to the thrust shoulder 80 via the secondary collar 84 will act on the thrust shoulder 80 to move the thrust shoulder 80 into contact with the groove 78 formed in the first bearing 58 of the secondary bearing 52.

A redundant pitch change shaft bearing 40 as described herein would enable longer service life and increased inspection intervals because failure of a primary bearing 50 would result only in a need for routine maintenance, instead of a catastrophic event.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft rotor assembly, comprising:
   a rotating pitch change shaft which rotates about an axis;
   a translating element disposed within the rotating pitch change shaft and movable along the axis; and
   a pitch change bearing assembly which transfers movement of the translating element to the pitch change shaft, the assembly including:
      a primary bearing coupled to the rotating pitch change shaft via the translating element when the primary bearing is in a first mode;
      a secondary bearing coupled to the rotating pitch change shaft via the translating element when the primary bearing is in a first mode; and
      a thrust shoulder coupled to the translating element, the thrust shoulder being movable into engagement with the secondary bearing in response to failure of the primary bearing in the first mode and such that, in a second mode, movement of the translating element is primarily transferred to the pitch change shaft via the secondary bearing.

2. The aircraft rotor system of claim 1, wherein further comprising a biasing mechanism configured to apply a preload to the secondary bearing.

3. The aircraft rotor system of claim 2, wherein at least one of the primary bearing and the secondary bearing includes at least one rolling element.

4. The aircraft rotor system of claim 3, wherein the preload applied by the biasing mechanism causes the at least one rolling element to roll during operation in the first mode.

5. The aircraft rotor system of claim 3, wherein each of the rolling elements is capable of sustaining a thrust load.

6. The aircraft rotor system of claim 1, wherein the primary bearing includes a first bearing and a second bearing, the secondary bearing being positioned between the first bearing and the second bearing relative to the axis of the translating element.

7. The aircraft rotor system of claim 6, wherein the secondary bearing includes a third bearing and a fourth bearing coupled by a biasing mechanism, and the thrust shoulder is positioned within a clearance defined between the third bearing the fourth bearing.

8. The aircraft rotor system of claim 6, further comprising: a collar disposed between the first bearing and the translational element, wherein the translational element is movable relative to the collar:
   an axial groove formed in an outward facing surface of the first bearing;
   a washer disposed within the axial groove;
   a flange extending radially from the translating element, the flange being arranged in contact with a surface of the washer;
   another collar disposed between the second bearing and the translational element, wherein the translational element is movable relative to the another collar;
   another axial groove formed in an outward facing surface of the second bearing;
   another washer disposed within the another axial groove; and
   a nut coupled to the translating element, the nut being selectively engaged with the another washer.

9. The aircraft rotor system of claim 8, further comprising: a shoulder extending from the translating element adapted to contact a first side of the thrust shoulder; and a secondary collar extending between a second side of the thrust shoulder and the nut.

10. The aircraft rotor system of claim 9, wherein a surface of at least one of the washer and the another washer wears in response to failure of the primary bearing in the first mode.

11. The aircraft rotor system of claim 1, wherein in the first mode, movement of the translating element is primarily transferred to the pitch change shaft via the primary bearing.

12. The aircraft rotor system of claim 11, wherein in the second mode, movement of the translating element is primarily transferred to the pitch change shaft via the second bearing.

13. The aircraft rotor system of claim 11, wherein the aircraft tail rotor system transforms to the second mode upon failure of the primary bearing.

14. The aircraft rotor system of claim 1, further comprising a shield disposed between the primary bearing and the secondary bearing.

15. A method of transmitting movement to a pitch change shaft comprising:
   transmitting movement from a translating element to a pitch change shaft via a primary bearing, the translating element including a thrust shoulder;
   shifting a position of the translating element relative to the primary bearing upon a failure of the primary bearing;
   moving the thrust shoulder of the translating element into contact with a secondary bearing to couple the secondary bearing to the translating element in response to the failure of the primary bearing; and transmitting movement from the translating element to the pitch change shaft via the secondary bearing.

16. The method of claim 15, wherein the thrust shoulder is movable in a first direction to couple the translating element to the secondary bearing.

17. The method of claim 16, wherein the thrust shoulder is movable in a second direction to couple the translating element to the secondary bearing.

18. The method of claim 15, wherein the thrust shoulder does not translate relative to the primary bearing while movement is transmitted from the translating element to the pitch change shaft via the primary bearing.

19. The method of claim 15, wherein coupling the secondary bearing to the translating element further comprises decoupling the primary bearing from the translating element.

* * * * *